United States Patent [19]
Coulter

[11] Patent Number: 6,141,405
[45] Date of Patent: Oct. 31, 2000

[54] METHOD AND SYSTEM FOR DETECTING FRAUDULENT COLLECT CALLS

[75] Inventor: Peter I. Coulter, Flanders, N.J.

[73] Assignee: AT&T Corp, New York, N.Y.

[21] Appl. No.: 08/928,285

[22] Filed: Sep. 12, 1997

[51] Int. Cl.[7] .................................................. H04M 1/66
[52] U.S. Cl. ........................ 379/188; 379/88.22; 379/111
[58] Field of Search .............................. 379/88.01–88.22, 379/188–200, 244, 218, 85, 111, 112, 113, 116, 88.23, 88.26

[56] References Cited

U.S. PATENT DOCUMENTS

| | | |
|---|---|---|
| 4,797,910 | 1/1989 | Daudelin ................................. 379/244 |
| 4,939,771 | 7/1990 | Brown et al. ........................... 379/218 |
| 4,969,185 | 11/1990 | Dorst et al. . |
| 5,414,755 | 5/1995 | Bahler et al. ............................. 379/67 |
| 5,483,581 | 1/1996 | Hird et al. . |
| 5,539,813 | 7/1996 | Jonsson . |
| 5,590,181 | 12/1996 | Hogan et al. . |
| 5,623,539 | 4/1997 | Bassenyemukasa et al. ............ 379/88 |
| 5,627,887 | 5/1997 | Freedman . |
| 5,894,511 | 4/1999 | Jordan .................................... 379/114 |

*Primary Examiner*—Scott L. Weaver

[57] ABSTRACT

A method and a system for recording information about a call in which voice signals of a party initiating a call are recorded, an acceptance verification query call to a billed party of the call is generated, and voice signals that are an affirmative response to the acceptance verification query call by the billed party are recorded. The voice signals of the party initiating the call and the billed party are then digitized and stored in a memory. The call can be a collect call or a bill-to-third-party call. Additionally, information relating to the time, date, the originating telephone number and the terminating telephone number of the call are stored in the memory. When the billed party challenges the charges for the call, the recorded voice signals of the party initiating the call and the billed party are generated as information that can be used for sustaining the charges.

12 Claims, 2 Drawing Sheets

METHOD AND SYSTEM FOR DETECTING FRAUDULENT COLLECT CALLS

BACKGROUND OF THE INVENTION

1. Field of the Invention

The present invention relates to the field of telecommunications. More particularly, the present invention relates to a method and a system for detecting fraudulent collect calls and bill-to-third-party calls.

2. Description of the Related Art

Years ago, when a customer contacted a billing center of a telecommunications service provider for denying all knowledge (DAK) of a collect call that was appearing on their bill, the service provider was able to examine a physical call ticket for the call for determining the name of the originating party. While examination of the physical call ticket took significant time and effort, many times the call ticket provided information that was helpful for sustaining collect call charges once the customer's recollection had been refreshed with the information provided by the call ticket.

In the conventional automated operator environment, such as that disclosed by U.S. Pat. No. 5,627,887 to Freedman and incorporated by reference herein, the name of the party placing a collect call is captured by a recording and played for the called (billed) party during an acceptance verification query message generated by an automated collect call system. For example, a called party might receive a message like "This is a collect call from 'recording here', will you accept the charges?," where a recording of the calling party's voice saying the calling party's name is inserted in 'recording here'. Presently, when a called party denies all knowledge of an accepted collect call, the recording or the name of the calling party can be easily retrieved and used for refreshing the called party's recollection for sustaining the collect call charges.

However, in situations when the originating number does not provide a listing having a meaningful name for the called party, such that of a coin operated telephone, a hotel room telephone, or from an overseas location, there may be no information available that can be used for refreshing the called party's recollection and thus sustaining the charges. Additionally, as the LEC environment becomes more competitive, obtaining data from a competitor LEC may be difficult for preventing DAK fraud, especially for smaller carriers in attempting to obtain information from a larger carrier.

What is needed is a way for collecting information about a collect call that can be used when a billed party denies all knowledge of receiving and accepting the call, thus preventing fraud.

SUMMARY OF THE INVENTION

The present invention provides a way for collecting information about a collect call that can be used when a billed party denies all knowledge of receiving and accepting the call, thus preventing fraud.

The advantages of the present invention are provided by a method and a system for recording information about a call in which voice signals of a party initiating a call are recorded, an acceptance verification query call to a billed party of the call is generated, and voice signals that are an affirmative response to the acceptance verification query call by the billed party are recorded. The voice signals of the party initiating the call and the billed party are then digitized and stored in a memory. According to the invention, the call can be a collect call or a bill-to-third-party call. Additionally, information relating to at least one of a time, a date, an originating telephone number and a terminating telephone number of the call are stored in the memory. When the billed party challenges the charges for the call, the recorded voice signals of the party initiating the call and the billed party are generated as information that can be used for sustaining the charges. Alternatively, phonetic representations of the voice signals of the party initiating the call and the billed party are stored in the memory.

BRIEF DESCRIPTION OF THE DRAWING

The present invention is illustrated by way of example and not limitation in the accompanying figures in which like reference numerals indicate similar elements and in which.

DETAILED DESCRIPTION

The present invention collects information that can be used when a billed party denies all knowledge of receiving and accepting the call, thus preventing fraud by recording both the name of the party initiating the call and the billed party's acceptance of the call. The present invention saves either a voice recording or a textual transliteration of the voice information of both the calling and called parties of a collect call in a file, along with other information such as the time and date of the call, and the originating and terminating telephone number of the call, so that if the billed party denies all knowledge of the call, the saved information can be used for refreshing the billed party's recollection and thus for sustaining the charges.

Figure 1:
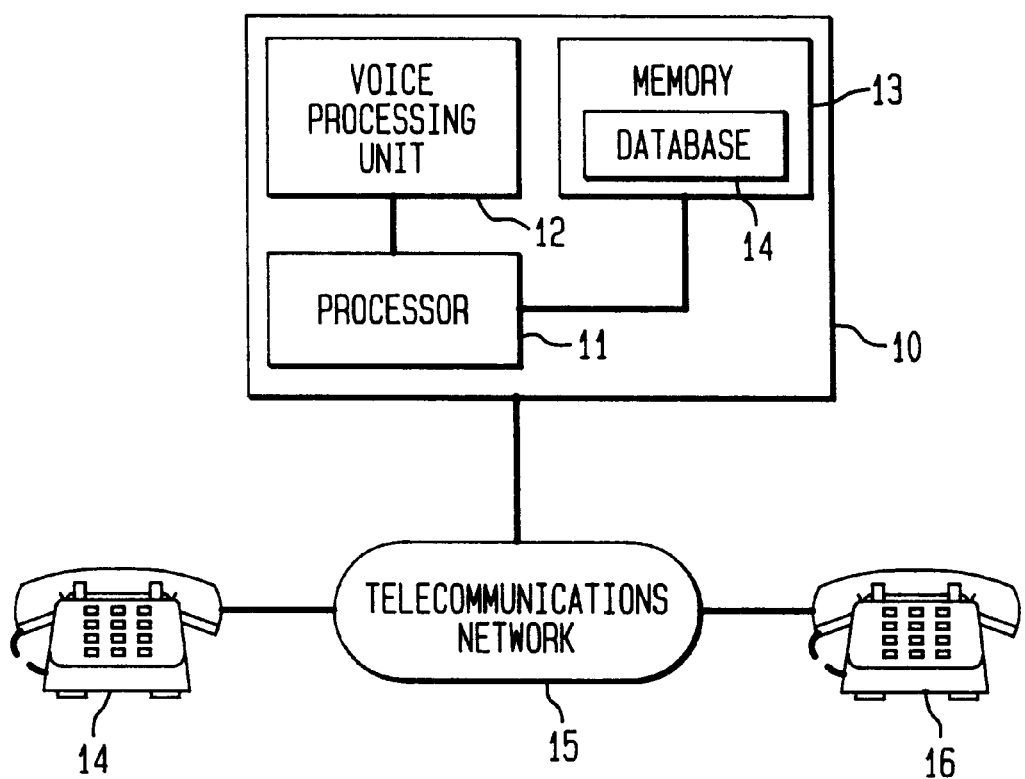
FIG. 1 shows an automated system according to the present invention.

FIG. 1 shows an automated system 10 according to the present invention. System 10 includes a processor 11, a voice processing unit 12, and a memory 13 having a database 14 in which information relating to collect calls is stored.

Figure 2:
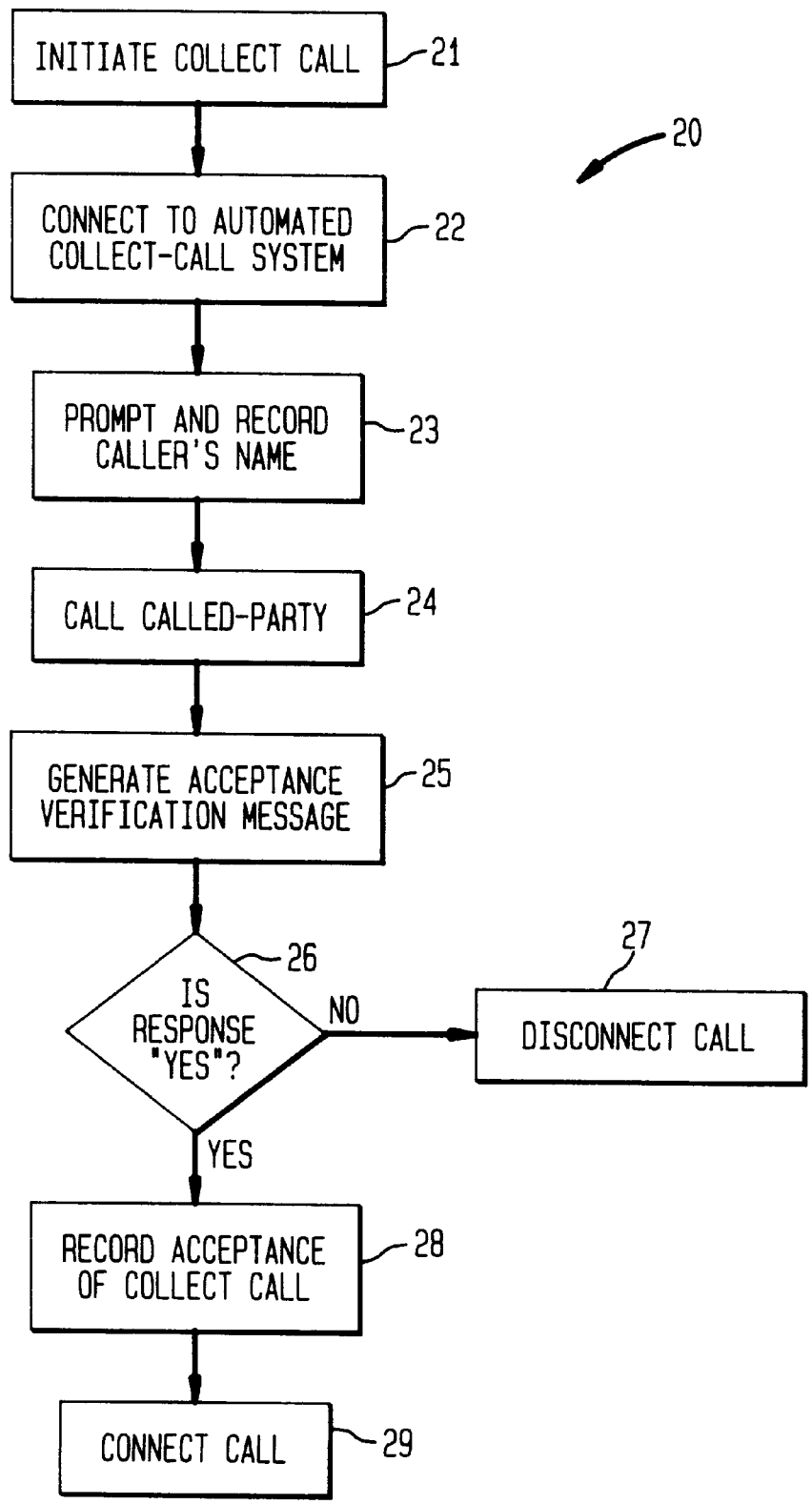
FIG. 2 shows a flow diagram for recording a calling party's name and a called party's acceptance of the collect call according to the present invention.

FIG. 2 shows a flow diagram 20 for recording a calling party's name and a called party's acceptance of the collect call according to the present invention. At step 21, a collect call is initiated at 14 in a well-known manner by a caller. At step 22, the call is connected through network 15 in a well-known manner to automated collect-call system 10. Once connected to system 10, system 10 generates a voice message at step 23 in a well-known manner prompting the caller to speak the caller's name so that a recording of the caller's name can be made. At step 24, automated collect-call system 10 calls the called party 16 in a well-known manner. At step 25, when the called party answers, automated collect-call system 10 generates a voice message identifying the call as a collect call, playing the voice recording of the calling party and asking whether the collect call will be accepted from the calling party. At step 26, system 10 waits for the called party's voice response to the acceptance query message. If the called party responds with a "Yes" or other equivalent response, the called party's voice acceptance is recorded and stored in a file in database 14 at step 28 along with the voice recording of the calling party's name, date, time, originating and terminating number of the call. At step 29, the two parties are connected. If, at step 26, the called party does not accept the call by responding with a "No" or other equivalent response, the call is courteously disconnected from both the calling and called parties.

The stored voice recordings of both the calling and called parties can be saved by being digitized in a well-known manner, such as by an analog-to-digital converter that is part of processor 11 or voice processing unit 12. Alternatively, the voice recording can be stored as a phonetic representation using well-known speech recognition technology. When a billed party challenges a collect call, the stored information for the subject call is retrieved from database 14 and used for determining whether the charges should be sustained.

The present invention can also be used for preventing "bill to third party" type scams. For example, one popular scam of this type is to use an automated system for scamming an innocent third party who speaks a language other than the language used by the automated system into accepting charges for a bill-to-third-party call. When the automated system asks for the party's name who is initiating the call, the initiating party says the billed party's name in the form of a question, such as "Mr. Ramos???" A party who receives the acceptance query message hears "blah blah blah" in the language of the automated system, then their name spoken like a question and they respond "Yes??" The called party's response to the acceptance query message causes the automated system hang up and connect the call initiating party to the dialed number. Later, when the billed party understandably challenges the call charges, the present invention can be used for verifying that the billed party was indeed scammed into accepting the charges. For preventing this type of scam, the present invention preferably records a digitized representation of the voice because a transliterated text version will not be effective in revealing the scam.

While the present invention has been described in connection with the illustrated embodiments, it will be appreciated and understood that modifications may be made without departing from the true spirit and scope of the invention.

What is claimed is:

1. A method for recording information about a bill-to-third party call, the method comprising the steps of:
   recording voice signals of a party initiating the bill-to-third party call;
   generating an acceptance verification query call to a billed party of the bill-to-third party call; and
   recording voice signals that are an affirmative response to the acceptance verification call by the billed party.

2. The method according to claim 1, further comprising the step of storing the recorded voice signals of the party initiating the bill-to-third party call and the billed party in a memory.

3. The method according to claim 2, wherein the step of storing the recorded voice signals that are the affirmative response includes the step of storing in the memory at least one of a time, a date, an originating telephone number and a terminating telephone number of the bill-to-third party call.

4. The method according to claim 1, further comprising the step of generating the recorded voice signals of the billed party that are the affirmative response to the acceptance verification query call.

5. The method according to claim 1, wherein the step of recording voice signals of the party initiating the bill-to-third party call includes the steps of:
   digitizing the voice signals of the party initiating the bill-to-third party call; and
   storing the digitized voice signals of the party initiating the bill-to-third party call in a memory.

6. The method according to claim 5, wherein the step of recording voice signals that are the affirmative response to the verification query acceptance call by the billed party includes the steps of:
   digitizing the voice signals of the billed party; and
   storing the digitized voice signals of the billed party in a memory.

7. The method according to claim 1, wherein the step of recording voice signals of the party initiating the bill-to-third party call includes the steps of:
   generating a phonetic the voice signals of the party initiating the bill-to-third party call; and
   storing the phonetic voice signals of the party initiating the bill-to-third party call in a memory.

8. The method according to claim 7, wherein the step of recording voice signals that are the affirmative response to the verification query acceptance call by the billed party includes the steps of:
   generating a phonetic representation of the voice signals of the billed party; and
   storing the phonetic representation of the voice signals of the billed party in a memory.

9. An automated call system, comprising:
   a memory storing information relating to a bill-to-third party call; and
   a processor recording the information relating to the bill-to-third party call and storing the information in the memory, the information including data relating to a voice recording of a party initiating the bill-to-third party call and a voice recording of a call acceptance by a billed party.

10. The system according to claim 9, wherein the information additionally includes at least one of a time, a date, an originating telephone number and a terminating telephone number of the bill-to-third party call.

11. The system according to claim 10, wherein the information is a digitized representation of the voice recording of the party initiating the bill-to-third party call and of the voice recording of the billed party.

12. The system according to claim 10, wherein the information is a phonetic representation of the voice recording of the party initiating the bill-to-third party call and of the voice recording of the billed party.

* * * * *